United States Patent
Salter et al.

(10) Patent No.: US 9,889,791 B2
(45) Date of Patent: Feb. 13, 2018

(54) ILLUMINATED BADGE FOR A VEHICLE

(71) Applicant: Ford Global Technologies, LLC, Dearborn, MI (US)

(72) Inventors: Stuart C. Salter, White Lake, MI (US); Aaron Bradley Johnson, Allen Park, MI (US); James J. Surman, Clinton Township, MI (US); Paul Kenneth Dellock, Northville, MI (US); Michael Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/955,770

(22) Filed: Dec. 1, 2015

(65) Prior Publication Data

US 2017/0151903 A1     Jun. 1, 2017

(51) Int. Cl.
*B60Q 1/50* (2006.01)
*B60Q 1/26* (2006.01)
*B60Q 1/56* (2006.01)

(52) U.S. Cl.
CPC ............. *B60Q 1/2696* (2013.01); *B60Q 1/56* (2013.01); *B60Q 2400/40* (2013.01)

(58) Field of Classification Search
CPC ..... B60Q 1/2696; B60Q 1/56; B60Q 2400/40
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Anabel Ton
(74) *Attorney, Agent, or Firm* — Jason Rogers; Price Heneveld LLP (57) ABSTRACT

A badge is provided herein. The badge includes a viewable portion having indicia thereon. A viewable portion light source is configured to emit light towards the viewable portion. A feature portion light source is configured to emit light towards a feature portion. A peripheral light source is configured to emit light through a periphery of the badge. Each light source is independently controlled by a controller.

18 Claims, 8 Drawing Sheets

(56) References Cited

U.S. PATENT DOCUMENTS

| | | |
|---|---|---|
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 * | 8/2009 | Bucher .................. B60Q 1/302 362/231 |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 * | 7/2011 | Flores .................. B60Q 3/0233 340/435 |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,333,492 B2 | 12/2012 | Dingman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,801,245 B2 | 8/2014 | De Wind et al. |
| 8,816,586 B2 | 8/2014 | Marcove et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0258262 A1 * | 11/2007 | Hanyon .................. B60Q 1/56 362/600 |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0321945 A1 | 12/2010 | Lang et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0154896 A1 * | 6/2015 | Dellock .................. G09F 21/04 362/509 |
| 2015/0267881 A1 * | 9/2015 | Salter .................. F21K 9/56 362/84 |
| 2016/0016506 A1 | 1/2016 | Collins et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 201881996 U | 6/2011 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

ILLUMINATED BADGE FOR A VEHICLE

FIELD OF THE INVENTION

The present disclosure generally relates to vehicle lighting systems, and more particularly, to an illuminated badge employing a plurality of light sources therein.

BACKGROUND OF THE INVENTION

Illumination arising from the use of a plurality of light sources offers a unique and attractive viewing experience. It is therefore desired to implement such structures in automotive vehicles for various lighting applications.

SUMMARY OF THE INVENTION

According to one aspect of the present invention, a badge is disclosed. The badge includes a viewable portion having indicia thereon. The badge further includes a first light source configured to emit light toward the viewable portion. A second light source is configured to emit light towards a feature portion. A third light source is configured to emit light through a periphery of the badge, and a controller is configured to independently illuminate the first, second, and third light sources.

According to another aspect of the present invention, a badge for a vehicle is disclosed. The badge includes a housing having a viewable portion. A viewable portion light source is configured to illuminate a first portion of the viewable portion. The badge further includes a feature portion light source configured to illuminate a second portion of the viewable portion, and an opaque member separating light emitted from the viewable portion light source from illuminating the second portion to the viewable portion.

According to yet another aspect of the present invention, a badge is disclosed. The badge includes a housing disposed on an exterior panel of a vehicle. The badge further includes an indicia disposed proximate a viewable portion. A peripheral light source is configured to direct light from within the badge through a periphery thereof, and an optical component is configured to direct the light towards a feature on the exterior of the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
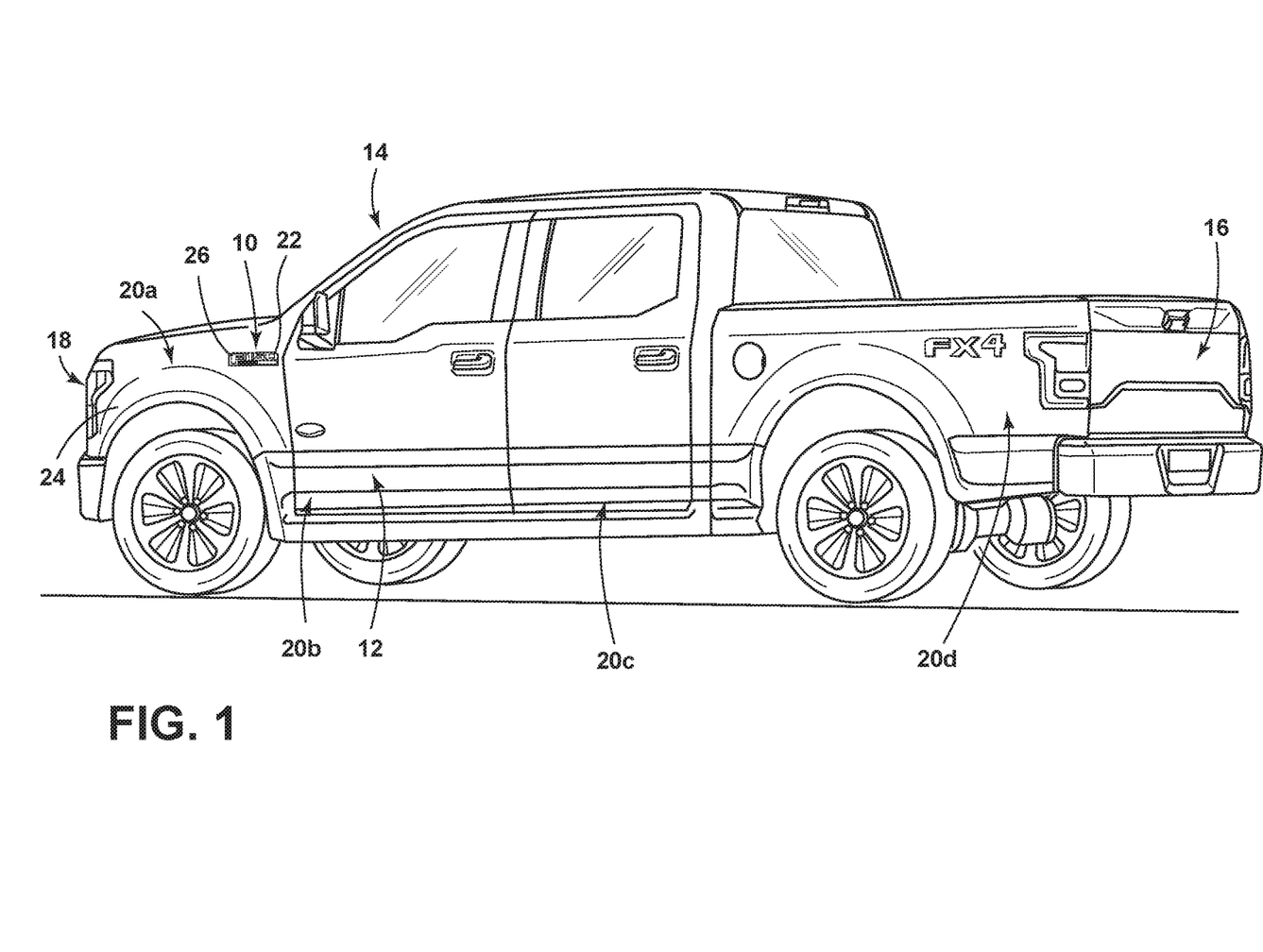
FIG. 1 is a perspective view of a vehicle having an illuminated badge disposed thereon.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated badge for a vehicle. The badge may advantageously employ one or more light sources configured to illuminate towards predefined locations. The badge may further include optics configured to direct light from an illuminated light source towards one of the desired locations based on a pre-defined event.

Referring to FIG. 1, a badge 10 is generally shown mounted on a front side portion 12 of a vehicle 14. In other embodiments, the badge 10 may be located elsewhere, such as, but not limited to, other locations of the side(s), the rear 16, or the front 18 of the vehicle 14. Alternatively, the badge 10 may be disposed inside the vehicle. Each portion of the vehicle 14 may include a plurality of exterior panels 20a-20d and the badge 10 may be attached to any one of the exterior panels 20a-20d. The badge 10 may be configured as an insignia that is presented as an identifying mark of a vehicle manufacturer and includes a viewable portion 22 that is generally prominently displayed on the vehicle 14. In the presently illustrated embodiment, the badge 10 is located on a front fender 24, thus allowing the badge 10 to be readily viewed by an observer looking at the side portion 12 of the vehicle 14. As will be described below in greater detail, one or more light source 26 is disposed within the badge 10 and may illuminate in a plurality of manners to provide a distinct styling element to the vehicle 14.

Figure 2:
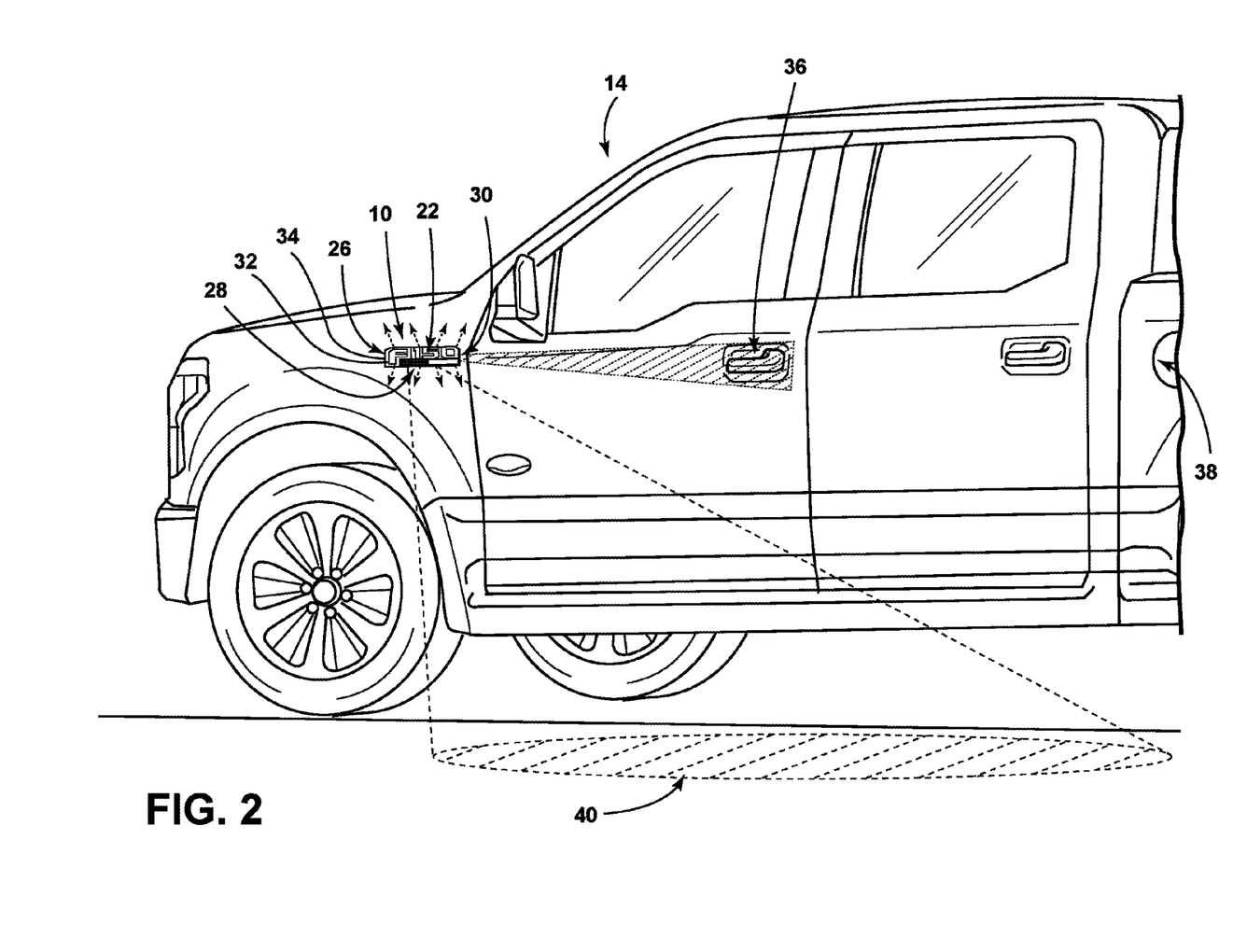
FIG. 2 is a perspective view of the illuminated badge in an illuminated state disposed on the front side portion of the vehicle, according to one embodiment.
Figure 3:
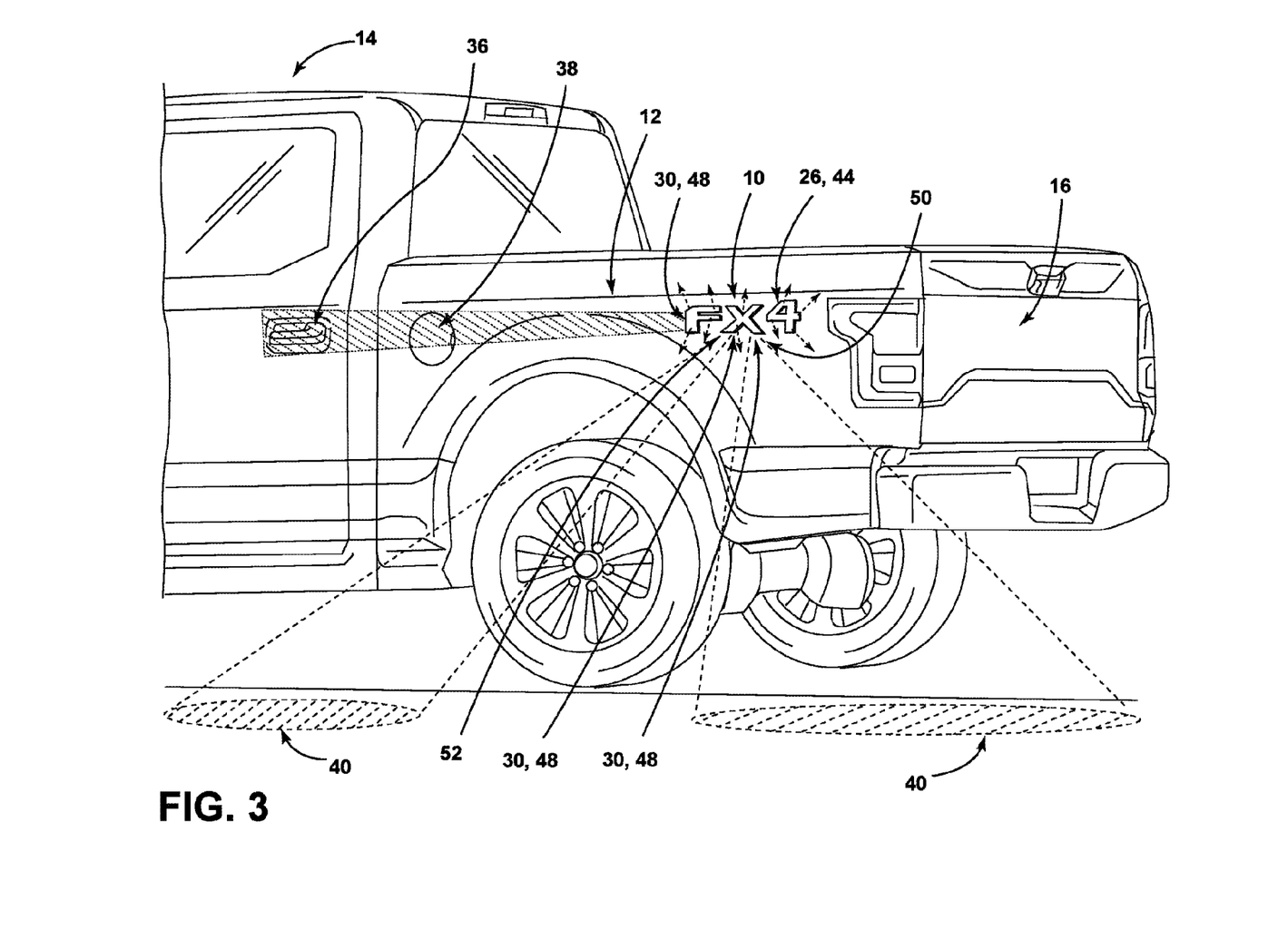
FIG. 3 is a perspective view of the illuminated badge in an illuminated state disposed on the rear side portion of the vehicle, according to one embodiment.

Referring to FIGS. 2-3, the badge 10 may include the light source 26 therein that is configured to emit light outward from within the badge 10. The light source may be configured to illuminate in a distinct manner and/or towards a predefined location. According to one embodiment, the badge 10 includes a plurality of light sources 26, 28, 30 each configured to illuminate outwardly from within a portion of the badge 10. The plurality of light sources 26, 28, 30 may be configured to emit light through the viewable portion 22 of the badge 10 to illuminate a feature, such as an insignia, disposed on a portion of the badge 10. Further, the plurality of light sources 26, 28, 30 may be configured to emit light through the viewable portion 22 and/or a background region 32. Additionally, the plurality of light sources 26, 28, 30 may also be configured to emit light through a peripheral portion 34 of the badge 10 to illuminate a feature of the vehicle 14, such as a handle 36 and/or fuel door 38, and/or a portion of the ground 40 proximately located to the vehicle 14.

Each light source 44, 46, 48 within the badge 10 may be independently illuminable by a controller 42 (FIG. 11) and emit any desired color of light. According to one embodiment, each light source 44, 46, 48 emits a different color of light therefrom. For example, the first light source 26 may correlate to a viewable portion light source 44 that may emit a neutral white light, the second light source 28 may correlate to a feature portion light source 46 that may emit red light, as will be described in greater detail below, and a third light source 30 may correlate to a peripheral light source 48 that may emit bright white light. It should be appreciated, however, that the badge 10 might include any number of light sources 44, 46, 48 that illuminate in any desired color without departing from the teachings provided herein.

Figure 11:
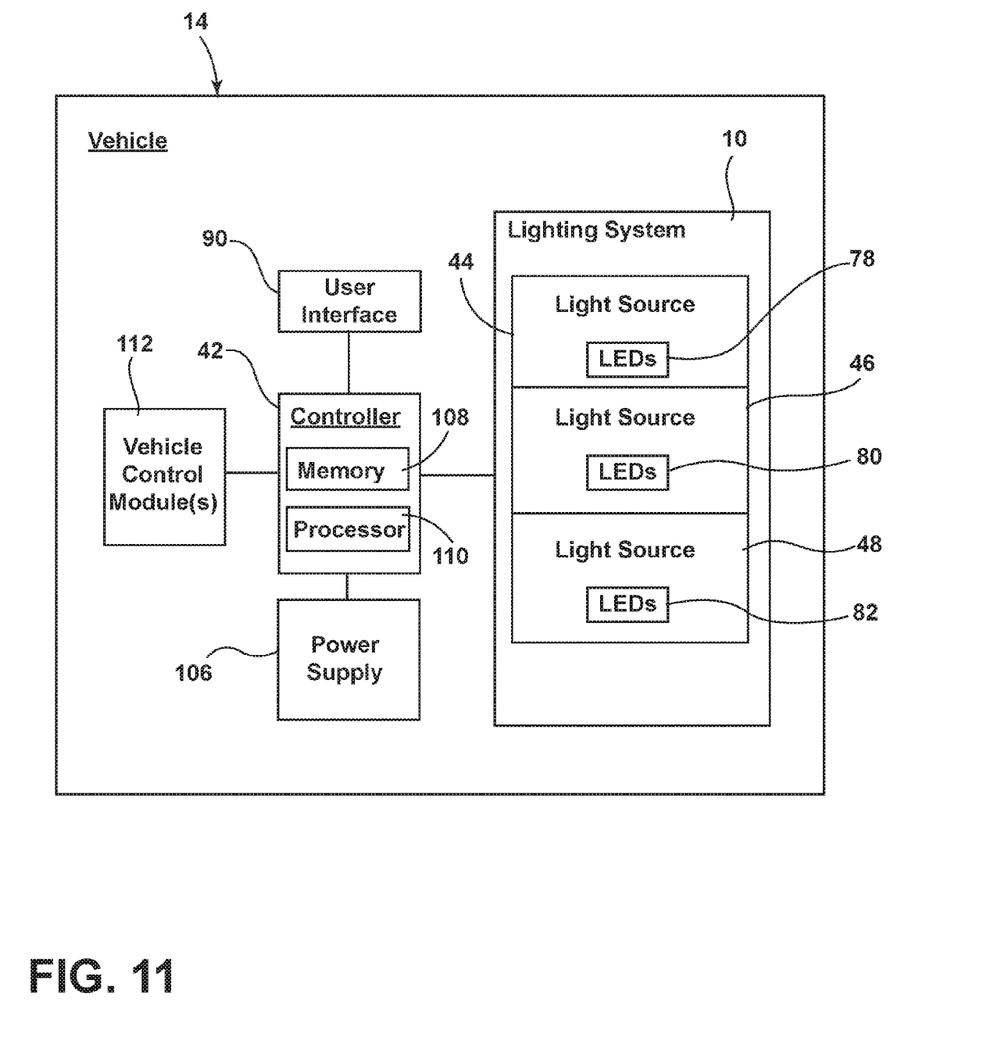
FIG. 11 is a block diagram of the vehicle and the badge.

As illustrated in FIG. 3, the badge 10 may be disposed on a rear portion 16 of the vehicle 14 and include a plurality of light sources 26, 28, 30 therein. The peripheral light source 48 may direct rewardly of the vehicle 14. According to one embodiment, the peripheral light source 48 may illuminate when the vehicle transmission is placed in reverse to provide additional light to the areas viewable in a reflective view from a side mirror of the vehicle 14. Additionally, or alternatively, the peripheral light source 48 may illuminate as a part of a welcome or farewell sequence and/or be configured to assist an occupant in the loading of items into the vehicle 14. The badge 10 may also illuminate a portion of the ground 40 forwardly thereof and towards a vehicle door. Accordingly, the badge 10 may be advantageously contoured for assistance in directing light towards pre-defined locations. For example, a first portion 50 of the badge 10 may have a rearwardly facing portion to assist in directing light rearwardly and a second forwardly directed portion 52 for assisting in directing the light in a forward direction. The light emitted forwardly and/or rearwardly may be independently controlled by the controller 42 (FIG. 11).

With further reference to FIG. 3, the badge 10 may additionally, or alternatively, emit light along the side portion 12 of the vehicle 14 and towards any desired feature. For example, the light emitted from the badge 10 may be directed towards a door handle 36, as described above. Additionally, or alternatively, light emitted by the badge 10 may be directed towards the vehicle fuel door 38 to assist an occupant when refueling the vehicle 14. It will be understood that any light source within the badge 10 may accomplish any function herein and that a single light source may be utilized for accomplishing multiple lighting effects without departing from the teachings provided herein.

It should be appreciated that the badge 10 may be disposed on any desired portion of a vehicle 14. Accordingly, the badge 10 may illuminate any exterior feature and/or any area disposed proximately to the exterior of the vehicle 14 without departing from the teachings provided herein. For example, the badge 10 may be disposed on the rear portion 16 (e.g., the tailgate) of the vehicle 14 and illuminate portions of the respective tailgate, a license plate, a rear bumper, a step integrally formed on the vehicle 14, a hitch attached to the vehicle 14, and/or a portion of the ground 40 disposed proximately to the rear portion 16 of the vehicle 14.

Figure 4A:
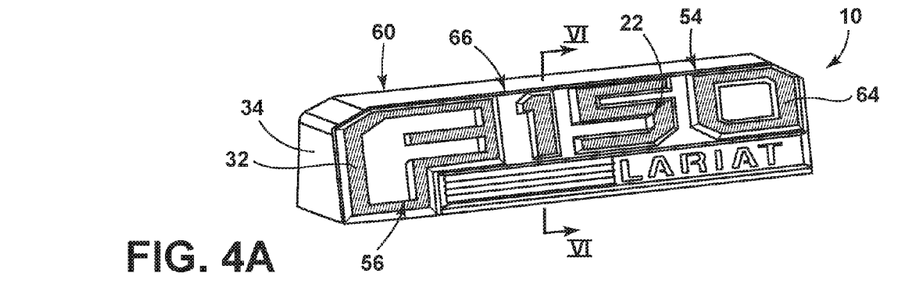
FIG. 4A is a perspective view of the badge, according to one embodiment, having a plurality of metallic layers on a viewable portion of the badge.
Figure 4B:
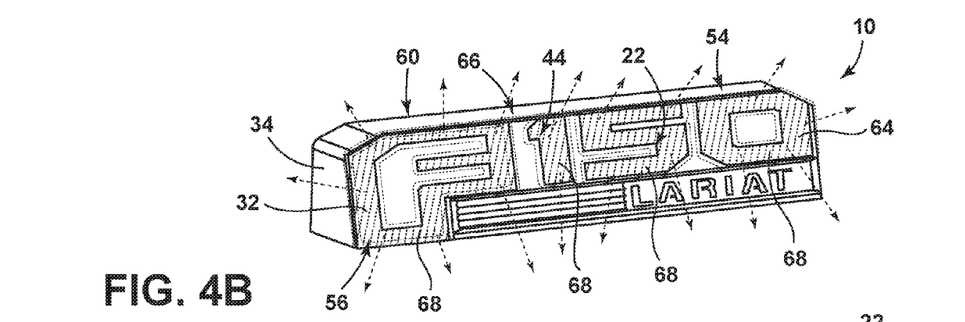
FIG. 4B is a perspective view of the badge, according to one embodiment, having a plurality of light transmissive portions on the viewable portion of the badge that correlate to a portion of indicia disposed thereon.
Figure 4C:
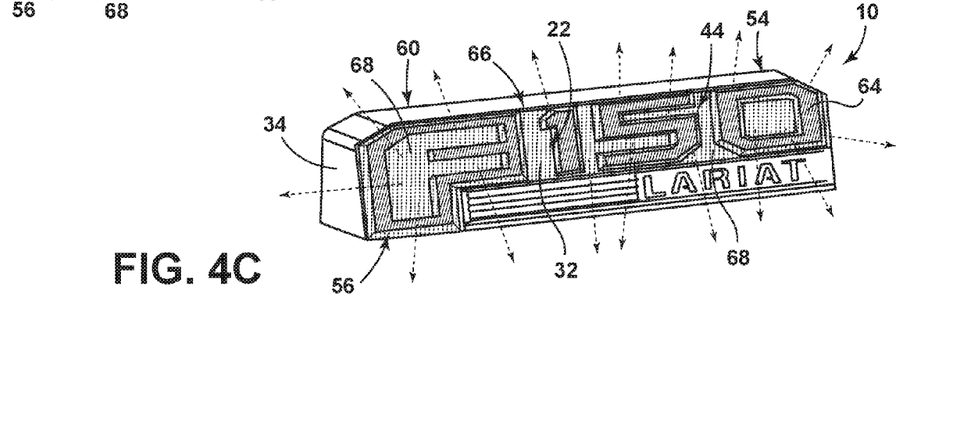
FIG. 4C is perspective view of an alternate embodiment of the badge having the plurality of light transmissive portions surrounding some of the indicia thereby illuminating a background region of the badge.

Referring to FIGS. 4A-4C, the badge 10 is exemplarily shown, according to one embodiment, having a housing 54 that includes the viewable portion 22 centrally located on a forward portion 56 thereof, a peripheral portion 34, and a rear portion 60. The viewable portion 22 may be made of a transparent and/or translucent material that may include a background region 32 and indicia 64. The indicia 64 may signify the make, model, or any other information that may be desirable to confer about the vehicle 14 upon which the badge 10 is attached to.

The badge 10 may include a viewable portion light source 44 that may be oriented to direct light outwardly through the viewable portion 22 of the badge 10. The viewable portion light source 44, and any other light source within the badge 10, may include any form of light source. For example, fluorescent lighting, light emitting diodes (LEDs), organic LEDs (OLEDs), polymer LEDs (PLEDs), solid state lighting, or any other form of lighting configured to emit light may be utilized. Further, each light source may include a plurality of LED sources. According to one embodiment, any light source within the badge 10 may be formed from a plurality of printed LEDs. Additional information regarding the construction of badges including printed LEDs therein is disclosed in U.S. patent application Ser. No. 14/881,489 to Dellock et al., entitled "ILLUMINATED BADGE FOR A VEHICLE," filed Oct. 13, 2015, the entire disclosure of which is incorporated herein by reference.

According to the embodiments illustrated in FIGS. 4A-4C, the viewable portion 22 may be substantially rectangular. However, it should be appreciated that the badge 10, and portions thereof, may be configured in any desired and/or practicable shape. Indicia 64 and/or any other design may be disposed on any front portion of the badge 10. According to one embodiment, the viewable portion 22, the rear portion 60, and the peripheral portion 34 may be constructed from a rigid material such as, but not limited to, a polymeric material and may be assembled together via sonic or laser welding. Alternatively, the viewable portion 22, the rear portion 60, and the peripheral portion 34 may be assembled together via low-pressure insert molding, or any other method known in the art, such as through the utilization of adhesives. Alternatively still, the badge 10 may be integrally formed within a mold.

Portions of the housing 54 that correlate to an A-surface 66 of the badge 10 visibly (e.g., the peripheral portion 34 and viewable portion 22) may be colored any color or may be metalized to give any desired portion of the badge 10 a metallic appearance. As used herein, the A-surface 66 may be defined as any surface of the badge 10 that may be visible once the badge 10 is attached to the vehicle 14. The A-surface 66 may include transparent and/or translucent portions thereby creating a light transmissive portion 68 within the badge 10. With respect to the illustrated embodiments, the peripheral portion 34 may be metalized to give the badge 10 a metallic outer appearance thereon. For example, a metallic layer may be applied to the indicia 64 via partial vacuum deposition. According to an alternate embodiment, a metallic layer may be applied to any portion of the housing 54 via electroplating a thin layer of chromium thereon. Alternatively still, an imitator of chrome may be used for aesthetic purposes. The metallic layer may be light transmissive to allow light to pass therethrough from an inner side to an outer side. Alternate processes may be used for coloring or layering material onto a portion of the housing 54, as known in the art without departing from the teachings provided herein.

According to one embodiment, the background region 32 employs a translucent blue color thereby partially concealing the components of the badge 10 disposed rewardly of the viewable portion 22. According to an alternate embodiment, the background region 32 and/or the indicia 64 may be substantially opaque.

With reference to FIG. 4B, a first portion of the indicia 64 may have a metallic layer disposed there around (e.g., "F") and a second portion of the indicia 64 may have a metallic layer disposed thereon that may be applied via partial vacuum deposition (e.g., "150"). The background region 32 may also be colored any desired color and/or incorporate a metallized finish on portions thereof. Accordingly, the metallic material should be light permeable to allow light to pass therethrough.

Referring to FIG. 4C, the indicia 64 may be formed from an opaque material and the background region 32 surrounding the indicia 64 may be light transmissive. Accordingly, the indicia 64, or a portion thereof, may be backlight when the viewable portion light source 44 is illuminated.

Figure 5:
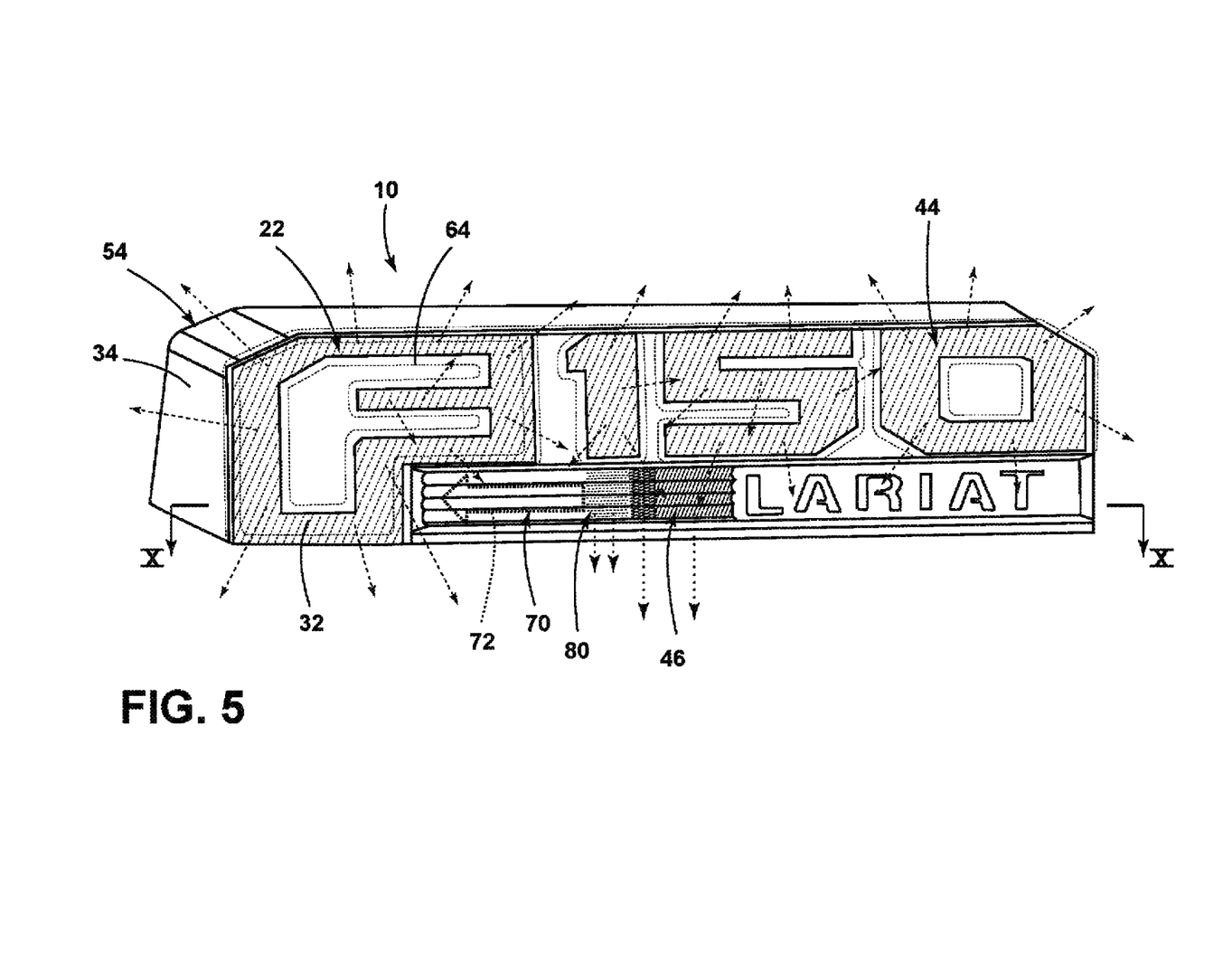
FIG. 5 is a perspective view of the badge, according to one embodiment, having a feature portion that dynamically illuminates a portion of the badge.

With reference to FIG. 5, the viewable portion 22 of the badge 10 may include the feature portion 70 thereon in conjunction with, or instead of, the indicia 64. The feature portion 70 may be configured as an illuminated feature that may be disposed on the vehicle 14. For example, the feature portion 70 may be a static or dynamically illuminated side marker, auxiliary turn signal, decorative feature, and/or any other desired feature.

The feature portion light source 46 may be configured to illuminate the feature portion 70, for example, in a sequential manner. According to one embodiment, the feature portion light source 46 includes a plurality of LED sources 80 that are sequentially activated by the controller 42 so that a first end portion of feature portion 70 is illuminated first. In sequence, adjacently disposed LED sources 80 are sequentially illuminated. Once all, or some, of the LED sources 80 that form the feature portion light source 46 are illuminated, the LED sources 80 stay lit until the controller 42 returns each LED source 80 to an unilluminated state. In other words, as each additional LED source 80 is illuminated, the LED sources 80 that were previously illuminated stay lit, until all of the LED sources 80 are illuminated. The time period that LED source 80 is illuminated before the adjacently disposed LED source 80 is illuminated can be selectively set by a time constant in the controller 42.

The controller 42 that controls the sequential illumination of the LED sources 80 can be any circuit suitable for the purposes described herein. According to one embodiment, the controller 42 delays 75 milliseconds between illumination of each respective LED source 80. This sequence repeats by lighting the adjacently disposed LED source 80 along arrow 72 until each LED source 80 within the viewable portion light source 44 is illuminated. According to an alternate embodiment, the time period of the sequence until the center LED is illuminated may be about two seconds. All of the LED sources 80 may maintain an illuminated state for a predefined time, such as five seconds, giving the time of the sequence to be approximately seven seconds, according to one embodiment. The sequence may be then repeated. It should be understood that the time values given herein are for exemplary purposes by way of a non-limiting example.

The feature portion light source 46 may illuminate fully or in any pattern based on any desired pre-defined event. According to one embodiment, the feature portion 70 is configured as an auxiliary turn indicator and sequentially illuminates to alert adjacently disposed vehicles of the driver's intention of making a turn. Alternatively, or additionally, illumination may occur as part of a welcome or farewell sequence, meaning that the illumination may occur as an occupant of the vehicle 14 leaves and/or approaches the vehicle 14 employing the badge 10. It is contemplated that the badge 10 may have a wide range of target locations such that the badge 10 may be used for a plurality of functions.

Additionally, a variable current may be supplied to each light source 44, 46, 48 to adjust the degree of illumination emitted from each light source 44, 46, 48. For example, the current may vary from 1 to 5 times the steady state current. Moreover, any light source 44, 46, 48 disposed within the badge 10 may illuminate in a plurality of colors and/or hues based on the wavelength emitted from each light source 44, 46, 48 and/or the intensity of light emitted therefrom.

Figure 6:
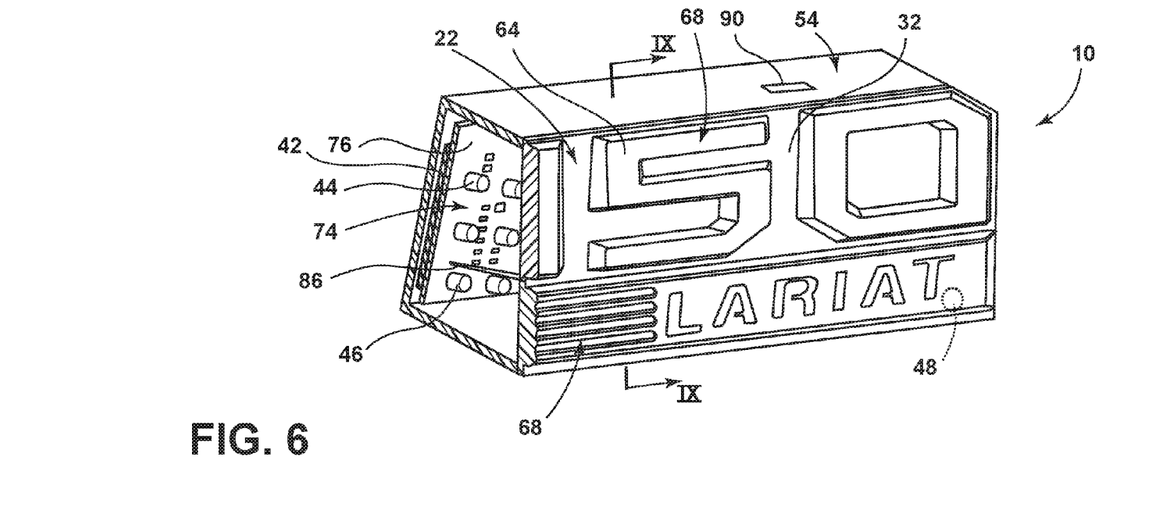
FIG. 6 is a cross-sectional view taken along the line VI-VI of FIG. 4A illustrating a portion of the badge having a plurality of light sources therein.
Figure 7:
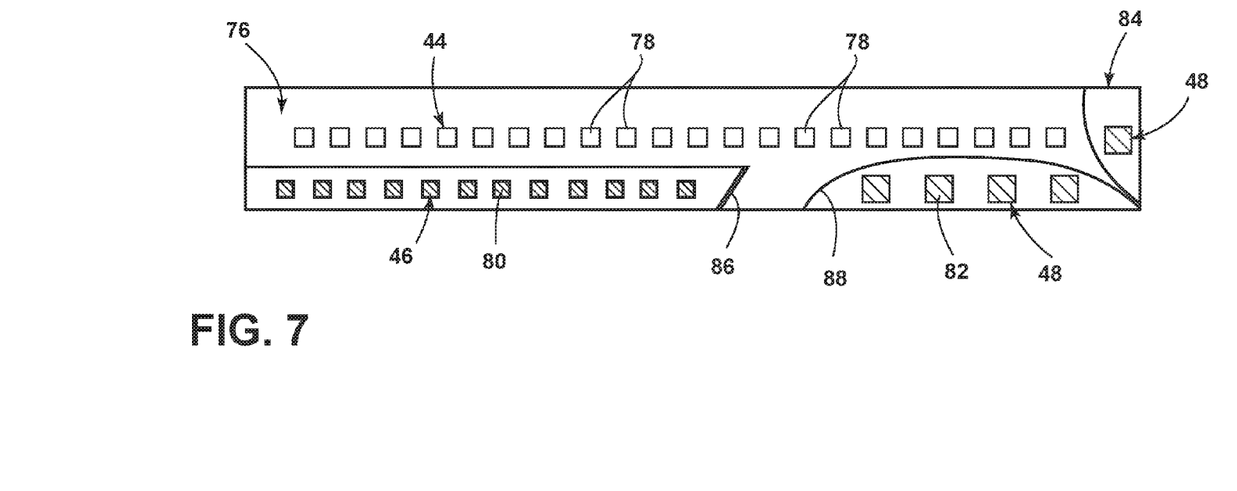
FIG. 7 is a front view of a printed circuit board (PCB), according to one embodiment, having a plurality of light sources thereon that illuminate varying portions of the badge.

Referring to FIGS. 6-7, a plurality of light sources 44, 46, 48 may be provided on a substrate 74 that may be configured as a flexible printed circuit board (PCB) 76 that is secured inside the housing 54. The plurality of light source(s) 44, 46, 48 may be disposed on the PCB 76 and orientated towards predefined locations, as described herein. A viewable portion light source 44 may include a plurality of LED sources 78 each positioned on an upper portion of the PCB 76. The feature portion light source 46 may comprise the plurality of LED sources 80 that may be disposed on a lower portion of the PCB 76. The peripheral light source 48 may likewise include a plurality of LED sources 82 that may be disposed proximately to a peripheral portion 84 of the PCB 76 and oriented such that light emitted therefrom is directed through the periphery of the badge 10. The PCB 76 may include a white solder mask to reflect light incident thereon. With respect to the embodiment shown in FIG. 6, a portion of the light emitted from the light sources 44, 46, 48 may be transmitted through the viewable portion 22. Another portion of the emitted light may be emitted into the interior of the housing 54 and become incident on the white solder mask of the PCB 76. As a result, the light may be redirected back toward the viewable portion 22 and outputted from the housing 54. This may help to ensure that the viewable portion 22 exhibits an optimal amount of illumination.

Each LED source 78, 80, 82 within the badge 10 may be independently operated to emit light onto a predefined location and/or desired region of the badge 10. For example, according to one embodiment, the viewable portion light source 44 includes about 80 independently controlled LED sources. According to the same embodiment, the feature portion light source 46 includes about 50 independently controlled LED sources 80 and the peripheral light source 48 includes about 50 independently controlled LED sources 82 that may be orientated in a plurality of directions.

A first reflective member 86 may encompass the feature portion light source 46 to segregate the light emitted from the viewable portion light source 44 from the feature portion 70 of the badge 10. Further, the first reflective member 86 may also substantially prevent light emitted from the feature portion light source 46 from illuminating the indicia 64 disposed on alternative portions of the badge 10.

A second reflective member 88 may encompass the peripheral light source 48. The second reflective member 88 may be configured to direct light emitted from the plurality of LED sources 82 outwardly through at least one light transmissive portion 68 in the periphery 34 of the badge 10. The light emitted through the light transmissive portion 68 may be of any color and may be directed towards any desired feature, such as the door handle 36, of the vehicle 14.

As illustrated in FIG. 6, the controller 42 is configured as an independent component that is disposed within the badge 10. With an independent controller 42, the badge 10 may independently function while relying on the vehicle 14 for power supply. However, it should be appreciated that the badge 10 may incorporate an individual power supply 106 (FIG. 11) as well. Moreover, the controller 42 may be disposed within the vehicle 14 and may be configured to control illumination of the badge 10 along with any other desired vehicle function.

In operation, each light source 44, 46, 48 may be activated using a variety of means. For example, the badge 10 may include a user interface 90 on the badge 10 and/or within the vehicle 14. The user interface 90 may be configured such that a user may control the wavelength of inputted light that is emitted from each light source 44, 46, 48 and/or the LED sources that form each light source 44, 46, 48. Alternatively, the user interface 90 may be used to switch the badge 10 through a plurality of modes and/or functions. The user interface 90 may use any type of control known in the art for control the light source 44, 46, 48, such as, but not limited to, switches (e.g., proximity sensors, push-type buttons) and may be disposed in any practicable location, such as on the badge 10 and/or within the vehicle 14. Additionally, or alternatively, the light source 44, 46, 48 may be automatically activated via an onboard vehicle system such as the vehicle security system and/or other vehicle system. For instance, sequential illumination of the feature portion light source 46 may occur as part of a welcome or farewell sequence, meaning that the sequential illumination may occur as an occupant of the vehicle 14 leaves and/or approaches the vehicle 14 employing the illuminated badge 10. It is contemplated that the badge 10 may have a wide range of target locations such that the badge 10 may be used for a plurality of functions.

Figure 8:
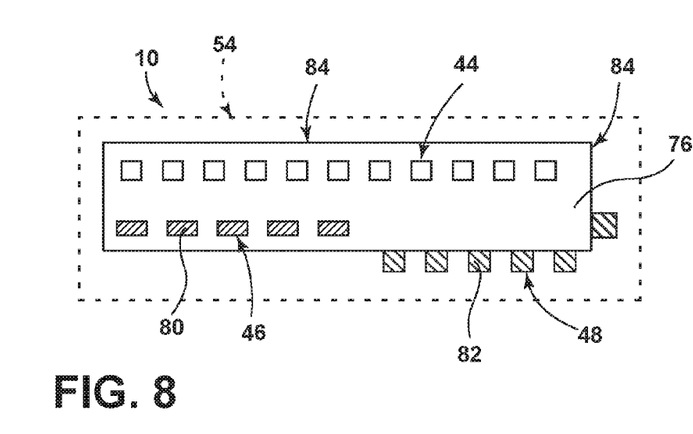
FIG. 8 is a front view of an alternate PCB having a plurality of light sources disposed on the periphery of the PCB to direct light outward from a periphery of the badge.

Referring to FIG. 8, the PCB 76 is shown from a front view including the peripheral light source 48 having a plurality of LED sources 82 that are disposed on a periphery of the PCB 76. As illustrated, a first portion of the peripheral light source 48 is disposed on the bottom of the PCB 76 and configured to direct downwardly and outwardly from the badge 10. A second portion of the peripheral light source 48 is disposed on a side of the PCB 76 and may be configured to direct light towards a feature on the exterior of the vehicle 14. In alternate embodiments, the peripheral light source 48 may be disposed on the top surface of the PCB 76 and have the peripheral light source 48 directed towards the periphery of the badge 10 rather than on the side(s) of the PCB 76.

Figure 9:
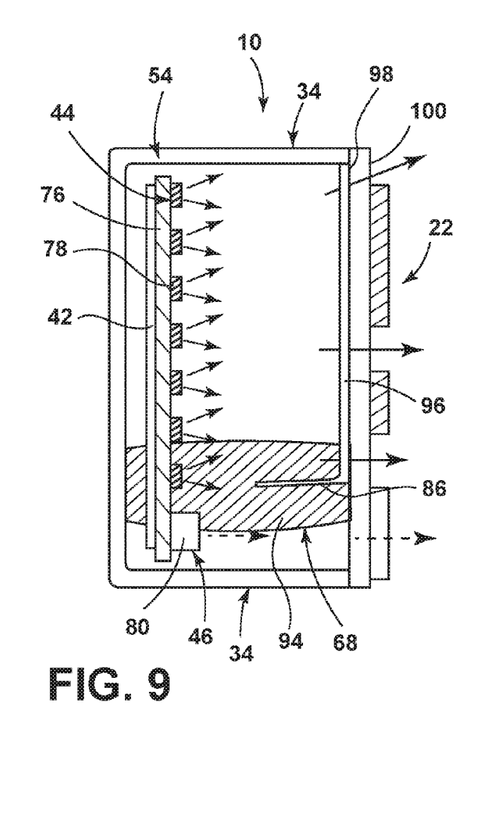
FIG. 9 is a cross-sectional view taken along the line IX-IX of FIG. 8 illustrating a portion of the badge having a plurality of light sources therein.
Figure 10:
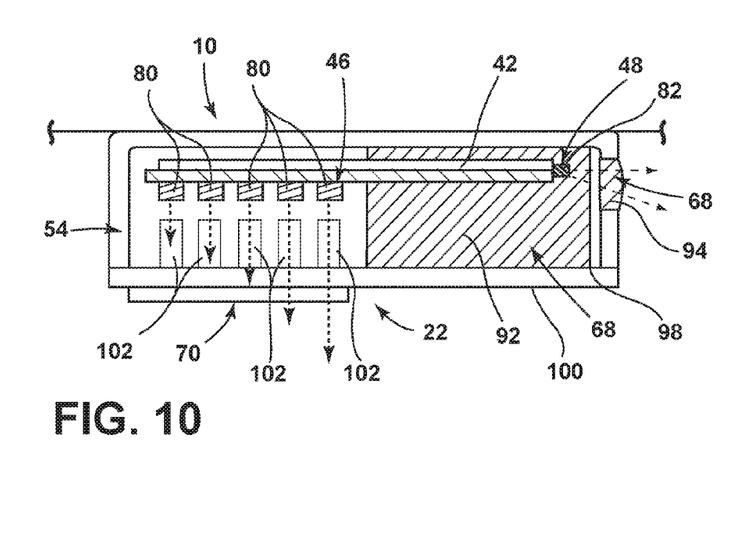
FIG. 10 is a cross-sectional view taken along the line X-X of FIG. 5 illustrating a portion of the badge having a plurality of light sources therein with light guides disposed above the plurality of light sources.

With reference to FIGS. 9-10, the badge 10 includes a viewable portion light source 44 that may be formed from a plurality of LED sources 78. The LED sources 78 may be printed, or otherwise disposed on, the PCB 76. Moreover, each of the plurality of LED sources 78 may be independently controlled by the controller 42.

The peripheral portion 34 of the badge 10 may include a light transmissive portion 68 such that light may be emitted therethrough, as described above. The light emitted through the peripheral portion 34 may be configured to illuminate a feature of the vehicle 14, such as the door handle 36. Accordingly, optics may be employed such that light emitted through the peripheral portion 34 may be directed towards specific locations at varying distances from the badge 10. More specifically, a first optical component 92 may be disposed on the bottom periphery of the badge 10 and configured to direct light towards the ground 40 proximate the vehicle 14. A second optical component 94 may be disposed on the side periphery of the badge 10 and configured to direct light towards a feature on the exterior of the vehicle 14. The optical component(s) 92, 94 may be configured as a lens or any other component configured to focus or dissipate light. Moreover, any optical components 92, 94 disposed on the badge 10 may be movable such that light emitted therethrough may be directed towards a plurality of desired locations.

A light diffuser 96 may be molded, or alternatively mounted, between the viewable portion 22 of the housing 54 and the viewable portion light source 44. For example, the light diffuser 96 may be a layer that is applied to the underside of the viewable portion 22 via partial vacuum deposition. The diffuser 96 can be transparent or translucent and generally functions to diffuse the light from the light sources 44, 46, 48 so that hot spots and shadows are eliminated. The inner surface 98 and/or outer surface 100 of the viewable portion 22 may be coated, roughened or receive micro-faceting to aid in the light diffusion performance. Additionally, or alternatively, a light diffusing material may be applied to or disposed on some or all of the light sources 44, 46, 48 disposed within the badge 10.

As illustrated in FIG. 11, the feature portion light source 46 may include a plurality of LED sources 80 that sequentially illuminate through the feature portion 70. According to one embodiment, the feature portion 70 may include a plurality of light guides 102 extending inwardly from the inner surface 98 of the housing 54. The plurality of light guides 102 may be configured to direct light emitted from the plurality of LED sources 80 disposed beneath the plurality of light guides 102. The plurality of light guides 102 may also include a reflective material on an exterior portion of the light guides 102 such that light emitted from proximately disposed light sources (e.g., viewable portion light source 44) is not directed through the viewable portion 22 of the badge 10. Additional information regarding the utilization of light guides within badges is disclosed in U.S. patent application Ser. No. 14/876,355 to Dellock et al., entitled "ILLUMINATED BADGE FOR A VEHICLE," filed Oct. 6, 2015, the entire disclosure of which is incorporated herein by reference.

With further reference to FIG. 10, a peripheral light source 48 may be disposed on the periphery of the PCB 76 and orientated such that light emitted therefrom is directed towards a feature on the exterior portion of the vehicle 14. As described herein, an optical component 92, 94 may be integrally formed in the periphery of the badge 10 for assistance in directing light emitted from the peripheral light source 48 towards a pre-defined location. It will be appreciated that the peripheral light source 48 may be orientated in any direction and light emitted therefrom may exit the badge 10 through any means known in the art. Further, it will also be appreciated that the peripheral light source 48 may direct light from the badge 10 towards any desired feature in any direction from the badge 10.

The controller 42 may have corrective algorithms that permit precise adjustment of the light sources 44, 46, 48 to compensate for color shifts, etc., over time. Furthermore, when sequentially illuminating the LED sources 78 within the badge 10, specific algorithms can be implemented to effect a smooth transition, which is not necessarily a linear adjustment of each respective color. Thus, to adjust from 0% brightness to 100% brightness, a linear adjustment might introduce an undesirable effect in the transition. Thus, in one embodiment, specific look-up tables (LUTs) can be provided that are used by a controlling processor 110 (FIG. 11) and/or controllers 42 containing the necessary brightness values for properly adjusting during the transition. The control may be affected using software algorithms specifically designed for creating desired patterns and controlling the transitions thereof Referring to FIG. 11, a box diagram of a vehicle 14 is shown in which an illuminated badge 10 is implemented. The badge 10 includes a controller 42 in communication with the viewable portion light source 44, the feature portion light source 46, and the peripheral portion light source 48. The controller 42 may include memory 108 having instructions contained therein that are executed by a processor 110 of the controller 42. The controller 42 may provide electrical power to any light source 44, 46, 48 via a power supply 106 located onboard the vehicle 14 and/or within the badge 10. In addition, the controller 42 may be configured to control the light output of each LED sources 78, 80, 82 independently based on feedback received from one or more vehicle control modules 112 such as, but not limited to, a body control module, engine control module, steering control module, brake control module, the like, or a combination thereof. By controlling the light output from each of the LED sources 78, 80, 82 independently, the badge 10 may illuminate in a variety of colors and/or patterns to provide an aesthetic appearance or vehicle information to an intended observer. For example, the illumination provided by the badge 10 may be used for numerous vehicle applications, such as, but not limited to, an aesthetic feature, a car finding feature, a remote start indicator, a door lock indicator, a door ajar indicator, a running light, etc.

Since lighting conditions may vary depending on a plurality of factors including, but not limited to, the current time, date, and weather conditions, the controller 42 may adjust the intensity of any light source 44, 46, 48 such that illumination of the badge 10 may be noticed under any condition. For example, the light intensity in Florida during a clear summer afternoon will generally be higher than the light intensity in Michigan during an overcast summer morning. Thus, by making this type of information known to the controller 42, the controller 42 can adjust any light source 44, 46, 48 accordingly.

The controller 42 may modify the intensity of the light emitted from any light source 44, 46, 48 by pulse-width modulation or current control. In some embodiments, the controller 42 may be configured to adjust a color of the emitted light by sending control signals to adjust an intensity or energy output level of any of the light sources 44, 46, 48. By adjusting the range of intensities that may be output from any light source 44, 46, 48, the light sources 44, 46, 48 within the badge 10 may confer any desired effect through the viewable portion 22. Moreover, varying the range of intensities of the light sources 44, 46, 48 may accentuate any appearance features of the badge 10.

In operation, the badge 10 may exhibit a constant unicolor or multicolor illumination. For example, the controller 42 may prompt the viewable portion light source 44 within the badge 10 to illuminate in first color thereby illuminating indicia 64 disposed on the badge 10. Simultaneously, a feature portion light source 46 may illuminate a feature portion 70 of the badge 10. A peripheral light source 48 may emit light towards a feature disposed on the exterior of the vehicle 14 and/or the ground 40 proximate the vehicle 14. As discussed above, each light source 44, 46, 48 may be independently illuminated by the controller 42 such that the viewable portion 22 may illuminate in a plurality of pre-defined patterns. It will be appreciated that a single light source may be utilized for multiple features without departing from the teachings provided herein.

In one embodiment, the controller 42 illuminates only the viewable portion light source 44, the feature portion light source 46, or the peripheral light source 48 independently. For example, the controller 42 may prompt the viewable portion light source 44 to illuminate indicia 64 disposed on the badge 10. Alternatively, the controller 42 may prompt the feature portion light source 46 to sequentially illuminate a feature portion 70 of the badge 10. Alternatively still, the controller 42 may prompt the peripheral light source 48 48 to emit light that is directed outwardly through the peripheral portion 34 of the housing 54. The controller 42 may illuminate each light source 44, 46, 48 in a unique color, or any of the light sources 44, 46, 48 may emit a color of a common wavelength.

The badge 10 may also include a user interface 90. The user interface 90 may be configured such that a user may control the wavelength of inputted light that is emitted by each light source 44, 46, 48. Such a configuration may allow a user to control which components of the badge 10 and/or features thereof are illuminated.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have a badge disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle badge comprising:
a viewable portion having indicia thereon;
a first light source configured to emit light toward the viewable portion;
a second light source configured to emit light towards a feature portion;
a third light source configured to emit light through a periphery of the badge;
an opaque member separating the first light source and the second light source; and
a controller configured to independently illuminate the first, second, and third light sources.

2. The badge of claim 1, wherein the viewable portion light source, the feature portion light source, and the peripheral light source are all comprised of a plurality of LED sources, wherein each LED source is independently illuminable.

3. The badge of claim 1, wherein the peripheral light source is disposed proximate a rear portion of a vehicle and emits light rearwardly of the vehicle when a transmission of the vehicle is placed in reverse.

4. The badge of claim 1, wherein the badge is disposed proximate a front portion of a vehicle and emits light towards a feature disposed on the exterior of the vehicle.

5. The badge of claim 1, wherein the peripheral light source emits light through the periphery of the badge towards a portion of the ground proximate a vehicle opening.

6. The badge of claim 1, wherein the feature portion light source comprises a plurality of LED sources that are independently illuminable.

7. The badge of claim 6, further comprising a controller configured to illuminate each second LED source sequentially in response to a predefined condition of a vehicle.

8. A badge for a vehicle, comprising:
a housing having a viewable portion;
a viewable portion light source configured to illuminate a background region surrounding an opaque indicia to backlight the indicia;
a feature portion light source configured to illuminate a second portion of the viewable portion; and
an opaque member separating light emitted from the viewable portion light source from illuminating the second portion to the viewable portion.

9. The badge of claim 8, wherein the viewable portion light source is configured as a plurality of independently controlled first LED sources and the feature portion light source is configured as a plurality of independently controlled second LED sources.

10. The badge of claim 8, further comprising:
an indicia disposed on the viewable portion and illuminable by the viewable portion light source, wherein the indicia is metallic in an unilluminated state.

11. The badge of claim 8, wherein the viewable portion light source illuminates in a substantially white color and wherein the feature portion light source illuminates in a non-white color.

12. The badge of claim 8, further comprising:
a peripheral light source configured to emit light through an optical component that is integrally formed in a periphery of the badge towards an exterior feature of the vehicle.

13. A badge comprising:
a housing disposed on an exterior panel of a vehicle and defining a peripheral portion surrounding a viewable portion, wherein the peripheral portion defines a light transmissive portion;
a peripheral light source within the housing and configured to emit light through the peripheral portion;
an optical component integrated within the light transmissive portion and configured to direct the light towards a feature of the vehicle;
a viewable portion light source configured to illuminate the viewable portion; and
a member separating the peripheral light source and the viewable portion light source.

14. The badge of claim 13, wherein the feature is a door handle.

15. The badge of claim 13, wherein the feature is a fuel door.

16. The badge of claim13, further comprising:
a controller configured to control illumination of the peripheral light source based on predefined events.

17. The badge of claim 13, wherein the peripheral light source further illuminates a portion of the ground proximate the feature of the vehicle.

18. The badge of claim 13, wherein the badge further comprises a feature portion light source that is configured to sequentially illuminate indicia disposed on the viewable portion.

* * * * *